Patented Sept. 30, 1952

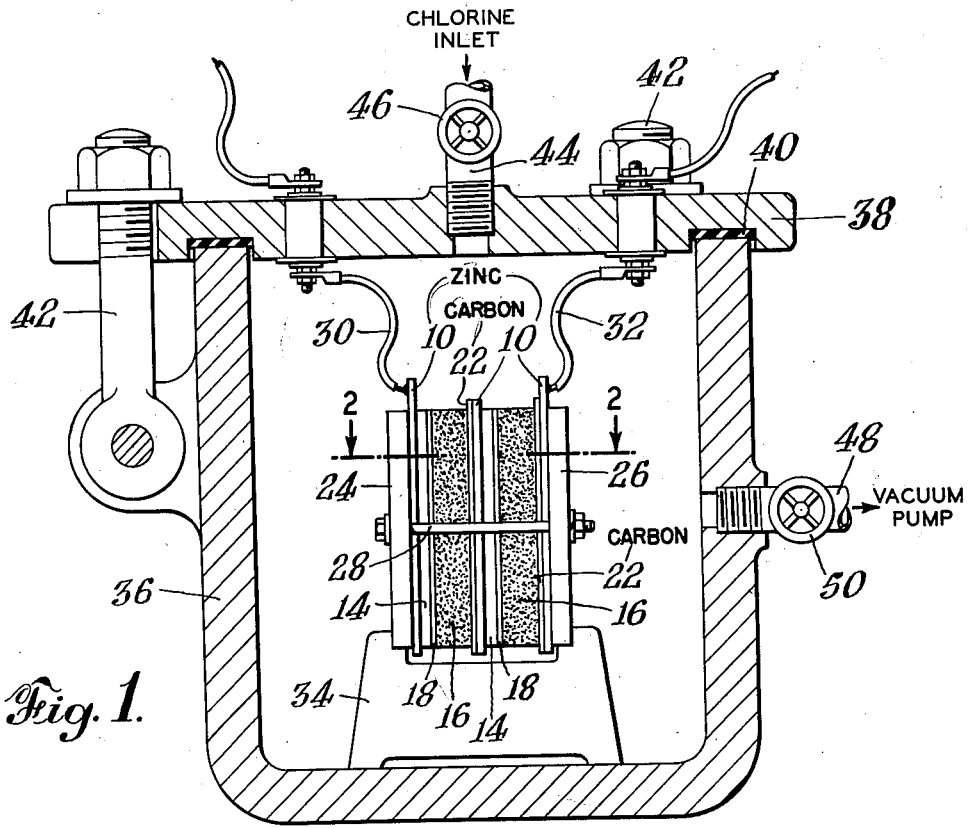
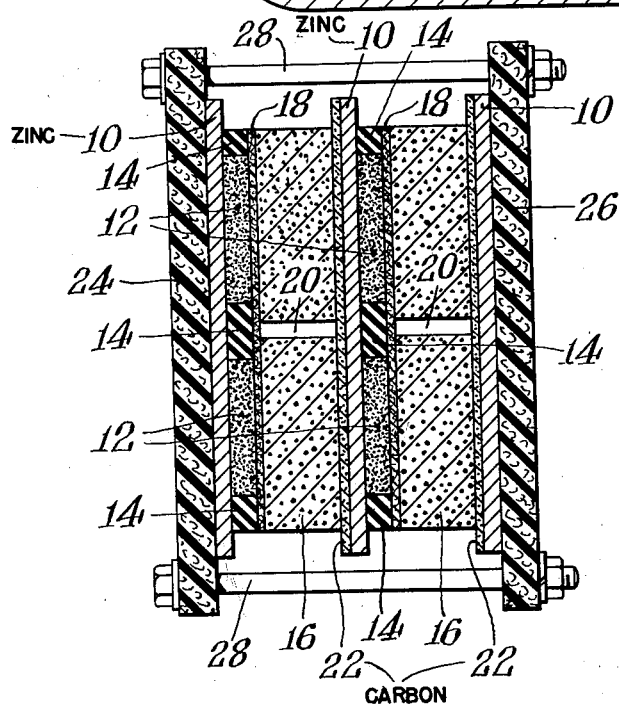

2,612,532

UNITED STATES PATENT OFFICE 2,612,532

PRIMARY CELL OR BATTERY

George W. Heise, Fairview, and Erwin A. Schumacher, Parma, Ohio, assignors, by mesne assignments, to Union Carbide and Carbon Corporation, a corporation of New York Application October 2, 1948, Serial No. 52,472

9 Claims. (Cl. 136—86)

1

This invention relates to a dry cell of the deferred action, gas-depolarized type and has for its object to provide a compact cell or battery of such cells giving a high current density, a high voltage, and high wattage per unit of weight and per unit of volume. Another object is to provide a gas-depolarized battery of improved output characteristics. A further object is to provide a deferred action, gas-depolarized battery and cell using low cost materials, having good keeping quality or shelf life prior to activation and which may be activated rapidly and maintain a heavy duty output. Other objects and features of the invention will appear in the following description.

Many suggestions have been advanced for a chlorine-depolarized cell but the embodiments of such ideas have usually been uneconomical of space and weight per unit output, of cumbersome construction and of restricted applicability.

According to this invention a deferred action, gas-depolarized dry cell is provided having high initial output per unit of weight, which cell is also economical of space and may be used in any position. Specifically a thin, flat, dry cell is provided with a metal anode, an immobilized electrolyte paste material contiguous one side of the anode, and with a moistened and porous carbon cathode adjacent the electrolyte paste material and in circuit therewith. The cathode is moist enough to absorb the depolarizing gas into an aqueous solution for effecting depolarization but is at the same time porous enough so that the depolarizing gas is absorbed through the porous cathode material into the cathode pores where it comes in contact with a greater area of the moistened material than if it merely contacted with the edges of the moist material.

Referring to the drawing:

Fig. 1 is a cross-sectional view showing one embodiment of this invention; and

Fig. 2 is an enlarged section on the line 2—2 of Fig. 1.

For purposes of illustration, this invention is shown embodied in an electric battery comprising two cells but it will be understood that as many cells as are desired may appropriately be connected. A typical cell comprises a zinc anode 10 and contiguous to the anode is an immobilized electrolyte material in the form of anode paste 12 made with a cereal paste, for instance flour or starch, cellulose, wood flour, bentonite and the like thickening agents but preferably with methyl cellulose, and aqueous zinc chloride solution prevented from spreading by paste-retaining spacer supports 14. A porous carbon cathode 16, wet with aqueous zinc chloride, is, preferably, separated from the anode paste by a bibulous, electrolyte-insoluble cellulose sheet 18, which prevents particles of the cathode from contacting the anode. Channels 20 extending from the edges of the cathode into or through the cathode are preferably used in large cells to provide access of chlorine to the inner parts of the cathode. A layer 22 of non-porous conductive material, for instance non-porous graphite, separates the cathode of one cell from the anode of the next cell. End clamping plates 24 and 26 of stiff insulating material, inert to chlorine, for instance fibre board impregnated with a resin containing vinyl chloride, are clamped by bolts 28 against the cells. Conductor leads 30 and 32 are connected to terminal plates which may be the anode of the cell at one end of the battery and a similar sheet of zinc or other metal or carbon at the other end of the battery. A pedestal 34 supports the battery cells within the casing 36, such casing together with a cover 38 and a gasket 40 providing a gas-tight housing for the battery when the parts are drawn together by the bolts 42. An inlet pipe 44 leads to any appropriate source of chlorine, preferably under pressure, for instance a cylinder of chlorine or an apparatus for generating chlorine. An inlet control valve 46 is normally closed until time for the battery to be activated. An outlet pipe 48 provided with a control valve 50 is connected to a source of vacuum so that, if desired, before the admission of chlorine, the housing and cells may be exhausted to facilitate the entry of chlorine into the housing and cells.

In a typical cell, the anode 10 is a circular sheet of zinc, 0.016 inch thick and about 3 inches in diameter. The zinc is of dry-battery quality preferably containing not more than 0.6% each of cadmium and lead and not more than 0.03% iron, by weight. The anode paste comprises water-soluble methyl cellulose, water and mercuric and zinc chlorides in the proportion of 360 parts by weight of dry 100 centipoises viscosity water-soluble methyl cellulose, 3000 parts of distilled water, 17.5 parts of mercuric chloride, and 300 parts of zinc chloride. The spacer elements are of resin which does not deteriorate in the presence of chlorine, for instance vinyl resin containing vinyl chloride, 0.02 inch thick and of a size to fit the anode and leave a margin of about 1/8 to 1/2 inch wide of zinc. The open portion of the spacer element is then filled with the anode paste and the excess paste removed by a straight edge passed over the surface of the spacer element. The layer of immobilized anodic electrolyte thus formed is coextensive with the spacer element, about 0.02 inch thick and weighs about 0.015 ounce per square inch of active anode surface. A sheet of bibulous separator material, conveniently a sheet of water-absorptive cellulosic tissue, or cloth of the usual materials, or glass, resin and the like, about 0.001 inch thick, for instance tissue paper, is wet with aqueous electrolyte solution (90 parts of distilled water and 10 parts of $ZnCl_2$, by weight) and placed over the immobilized electrolyte. Either before or after application, the separator sheet is trimmed so that it is coextensive with the spacer element.

The cathode material is prepared by mixing 12 parts by weight of a carbon black with 60 parts by weight of the aqueous electrolyte solution and working the mixture until it is free from lumps. The cathode is conveniently prepared by filling a mold of such size as to give, when compressed, a cake of a size to be supported on the spacer element and of the desired thickness, compressing and removing the cake thus formed. The cake is then applied to the spacer element in contact with the anode paste or, if used, the separator. A sheet of non-porous conducting material, for instance non-porous graphite coextensive with the cathode or, preferably, slightly larger and coextensive with the anode, is then applied to the cathode. Any anode paste which extrudes at the edges of the cell when the cathode cake is applied is preferably wiped off. For convenience in producing batteries comprising a plurality of cells, the anodes may have the non-porous conducting layer 22 attached to them.

The characteristics of the carbon used in the cathode are important. For a cell which is to develop high voltage at high current drain as quickly as possible after the admission of chlorine to the housing, the carbon should have the largest possible surface development for rapid sorption of chlorine and to make the gas electrochemically effective; it should have the highest possible conductivity to keep down internal resistance; it should absorb large quantities of aqueous electrolyte without affecting the depolarization reaction; it should, over a wide range of wetness values, absorb chlorine; and it should be moldable, either with binders or, preferably, alone or with only the aqueous electrolyte, to give a firm, compact mass with the best possible adhesion to adjacent cell elements. The best carbons are carbon blacks with a chain-type structure having a mean ultimate particle diameter of from 5 to 45 millimicrons, for instance small particle sized acetylene blacks, gas blacks having a chain structure, and the like. These blacks with ultimate particle sizes up to 100 millimicrons may be used.

Binders used for reinforcing the cathode cake comprise glass or cellulosic fibres or vegetable or mineral fibres which are distributed throughout the mix and which are not affected by chlorine or electrolyte. Other binders which may be used advantageously are powdered or fibrous substances which become tacky or sticky in contact with electrolyte, for instance cereals such as flour or starch, or vegetable, animal or synthetic glues, gelatine products and the like.

Carbon blacks which are usable in the cells but are not so satisfactory are characterized by large particle size, low sorptive capacity for electrolyte, and discontinuous structure with isolated particles.

Relatively unsatisfactory carbonaceous materials are lampblacks, cokes, graphites and the like unless used with metals or their salts or oxides, for instance copper, silver, platinum, nickel which may exist in more than one valence. Only a small quantity (<1.0%) is necessary. Also, these catalysts may be used with any of the cathode materials, and may be applied either by admixture with carbon or the cathode electrolyte. But as the salts of the metals which are more cathodic than the anode metal may cause corrosion of the anode metal during storage of the cell, it is preferred to use no such additions.

A satisfactory circular cell of 1 13/16 inches diameter of active material was prepared using materials of the following specifications: zinc anode, 0.011 inch thick; electrolyte, 90 parts by weight of water and 10 parts of zinc chloride; anode paste, 14 grams of 100 centipoises methyl cellulose, 120 grams electrolyte, 0.70 gram of mercuric chloride; separator, kraft paper 0.001 inch thick soaked in electrolyte; cathode mix, 200 grams of acetylene black, 519 grams of electrolyte. The cell was prepared using 0.7 gram of anode paste giving a layer 0.014 inch thick, 6.20 grams of cathode mix compressed at 14.75 pounds per square inch forming a disc 1 13/16 inches in diameter by 0.175 inch thick; the cathode density was 0.84 gram per cc. and the porosity was 31.7%, meaning that the cathode contained 31.7% of its volume as evenly distributed pore openings. The cathode collector or cathodic terminal was a sheet of zinc 0.011 inch faced with a non-porous layer of conducting paint 0.004 inch thick. The assembled cell including the cathode terminal was 0.217 inch thick and when clamped between the clamping plates was 0.188 inch thick. This cell, in a housing, was evacuated to 27½ inches mercury. Chlorine pressure was then built up to 90 pounds per square inch at 23° C. The open circuit voltage of the cell at 90 pounds chlorine pressure was 2.10 volts. Upon closing the circuit drawing 1.42 watts per square inch of active anode surface or 3.68 watts from the cell, the results were:

*Table 1*

| Minutes on Test | Voltage | Current (amperes) |
| --- | --- | --- |
| 0 | 1.85 | 1.99 |
| 1 | 1.82 | 2.02 |
| 2 | 1.80 | 2.04 |
| 3 | 1.77 | 2.08 |
| 4 | 1.73 | 2.12 |
| 5 | 1.70 | 2.16 |
| 6 | 1.67 | 2.19 |
| 7 | 1.62 | 2.26 |
| 8 | 1.57 | 2.34 |
| 9 | 1.52 | 2.42 |
| 10 | 1.43 | 2.58 |
| 11 | 1.35 | 2.70 |
| 12 | 1.18 | 3.12 |
| 13 | 1.38 | 1.99 |
| 15 | 1.34 | 1.99 |

For the last two readings, when the cell was practically exhausted, the load was changed to bring the current drain back to the original of 1.99 amperes to check the voltage drop to indicate the performance of the cell at the same current drain. The drop in voltage between 9 and 10 minutes indicates a critical accumulation of by-products of the reaction. Since this cell was intended to function for only 5 minutes, it is obvious that an ample factor of safety was being maintained. Had the current drain on this cell been reduced, the useful life of the cell would have been extended.

The zinc anode may theoretically be as thin as 0.0016 inch for an active cell life of 10 minutes at average drain of 2.20 amperes for the cell described, and may be as thick as desired. Practically, the thinness of the anode is determined by mechanical considerations, for instance its stiffness and its ability to resist deformation, and perforation by chemical attack. Anodes of substantially pure zinc, for example the grade previously mentioned, are preferably no thinner than 0.011 inch.

Metals other than zinc may be used as anodes. When chlorine at atmospheric pressure is the activating and depolarizing gas, anodes of the following materials immersed in dilute solution of their respective chlorides, give the open circuit voltages listed in Table 2.

It will be noted that chlorine depolarized cells of substantial, useful voltage can be produced, even with metals (Fe, Cd, Ni, Cu, etc.) whose potentials are too low for consideration with conventional battery depolarizers.

*Table 2*

| Anode | Voltage |
|---|---|
| Magnesium | 2.85 |
| Aluminum (amalgamated) | 2.45 |
| Aluminum | 2.05 |
| Zinc (amalgamated) | 2.05 |
| Zinc | 2.02 |
| Iron | 1.75 |
| Cadmium | 1.70 |
| Nickel | 1.55 |
| Copper | 1.15 |

The reactions when zinc or amalgamated zinc is the anode and chlorine is the activating gas, are—

At anode:
$$Zn \rightarrow Zn^{++} + 2e$$

At cathode:
$$Cl_2 + 2e \rightarrow 2Cl^-$$

Overall reaction:
$$Zn + Cl_2 \rightarrow ZnCl_2 + 2F$$

Similar reactions occur with anodes of other metals.

Chlorine differs from the other halogens with respect to practical features, for instance availability of commercial quantities of the halogen, cost, boiling point, vapor pressure and the like. However, bromine may be used as it exists in vapor form below the boiling point of water; and the cells, and supply of bromine may be maintained in a heated condition to provide the requisite amount of gaseous bromine. Operation of the cell with either bromine or chlorine at temperatures just short of the boiling point of the electrolyte and pressures corresponding to the gas-liquid equilibrium pressures of the halogen is contemplated. Operation of the cell at higher temperatures than correspond to the gas-liquid equilibrium pressures results in poorer performance. At suitable temperatures and pressures to maintain the gaseous condition, other gases such as chlorine peroxide ($ClO_2$) or nitrogen peroxide ($NO_2$) may be used with, or to replace, chlorine or bromine. Preferably, however, the chlorine peroxide is used as it is completely consumed whereas nitrogen peroxide is not, being only partially reduced electrochemically.

Aluminum and magnesium anodes in acid or neutral electrolyte corrode more than iron and zinc anodes during storage and also during discharge of the cell. Thus cells having magnesium and aluminum anodes are less reliable, after storage, than cells having zinc or iron anodes. Also cells containing magnesium have not the ampere-hour capacity of cells containing zinc, partly because the reaction product, $MgCl_2$, has a lower solubility than zinc chloride, and partly as the magnesium chloride formed during discharge of the cell crystallizes from a saturated solution with six molecules of water of hydration and thus, in effect, acts to dehydrate the cell and to deposit hydrated magnesium chloride. If short life is not a deterring factor, cells containing anodes of magnesium may be advantageous in view of their higher voltage.

Where the anode is magnesium, the use of an electrolyte which maintains a pH above 10.5 will prevent corrosion of the anode prior to activation of the cell, for instance where magnesium is the anode, an electrolyte consisting of sodium hydroxide, or the equivalent in potassium, calcium, barium or other basic metals, materially reduces corrosion of the anode during storage of the cell. By way of example an electrolyte comprising a 2 per cent solution of NaOH has proved satisfactory. The same basic electrolyte solution is used for preparing both the anode paste and the cathode. The alkaline material gives an oxide or hydroxide, of the metal of the anode as a layer on the surface of the anode, the oxide or hydroxide being insoluble in the solution of the electrolyte and thus protecting the anode metal. During activation with chlorine this alkaline material or base is neutralized. Magnesium anodes give a lighter weight cell than zinc anodes.

One active electrode surface is that between the anode and the immobilized electrolyte. On the left side of each anode, except the leftmost anode illustrated, is the conducting coating 22 which should preferably have the cathode material of the adjacent cell free from its edges so as to minimize the danger of any cathode material being placed contiguous the metal of the adjacent cell. The conducting coating may be on the leftmost anode as, although unnecessary on this anode, it does no harm and it is more convenient in making the battery to have fewer different types of parts.

The characteristics of the anode paste are important in the type of cell herein disclosed. The anode paste should, at all times, have such a consistency that it is sufficiently soft to make good contact with the adjacent elements of the cell, yet not so fluid that it runs from between the adjacent elements, and the character of the anode paste in these respects should not change materially over a temperature range of from 0° C. to 40° C. upon storage of the cell. The paste should also contain sufficient aqueous electrolyte to be highly conductive. Pastes prepared by mixing the usual cereals with an aqueous solution of the electrolyte salt, in such proportions as to give a paste of the proper water content and viscosity, may be used but cells so prepared have relatively poorer keeping quality than cells containing methyl cellulose paste and are characterized by less uniform performance after storage.

It was found, however, that if a paste is made containing a water-soluble alkyl cellulose characterized by being more soluble in cold water than in hot water the gel is characterized by increasing viscosity as the temperature rises even though there is no loss of water; and this characteristic of this material is utilized to advantage in the cell described herein, particularly as the increase in viscosity upon increase in temperature compensates for the lowering in gelling temperature with the rise in zinc chloride concentration resulting from operation of the cell.

In the preferred method of making the paste, the fibrous methyl cellulose is macerated with a hot aqueous solution of zinc chloride or other electrolyte, for instance at 75° to 85° C. The mix is allowed to cool slowly, to allow the fibres to take up as much of the liquid as they will absorb in a reasonable length of time and to permit the escape of entrapped air, for instance over a time interval of from ½ to 24 hours, or as may be necessary. The resultant semi-pasty mixture is then refrigerated to about −5° C. to +10° C. until clear, and stirred until homogeneous. The preferred mix has a consistency between heavy glucose syrup which is difficult to pour but still readily spreads and a homogeneous sticky paste.

Water-soluble alkyl celluloses may be obtained in many so-called "viscosities" depending upon how they are aged and otherwise treated during manufacture. The "viscosity" rating of the alkyl cellulose means that an aqueous solution containing a given percentage of a higher "viscosity" alkyl cellulose has a higher viscosity than has an aqueous solution containing the same percentage of a lower "viscosity" alkyl cellulose. Thus methyl cellulose on the market is supplied in such "viscosities" that 2% aqueous solutions at 20° C. have average viscosities of 15, 25, 50, 100, 400, 1500, 4000 and higher centipoises. For the purposes of the present invention, anode paste may be made with methyl cellulose of any of these "viscosities," which represent relative polymerization, less of the higher molecular weight, higher viscosity material being required than of the lower molecular weight material. The temperature at which gelation occurs on heating depends upon the strength of the solution and the type of methyl cellulose. Low viscosity material at 2% concentration in water gels at about 65° C. whereas the high viscosity material will gel at 30° C. at 10% solids.

A paste which is satisfactory for the purposes of the present invention can be prepared by macerating, at 80° C., 14 grams of fibrous 100 viscosity water-soluble methyl cellulose (a 2% solution has a viscosity of 100 centipoises at 20° C.) in 120 grams of aqueous 10% zinc chloride containing 0.70 gram of mercuric chloride. This mix is allowed to cool overnight, finally reaching a temperature of about 25° C., at which time the mix is semi-pasty but somewhat fibrous and not clear, not transparent nor a homogeneous fluid. The mix is then placed in a refrigerator maintained at 0° C. until it is clear and fluid (approximately 16 hours), stirred until homogeneous and has the consistency of heavy glucose syrup. Anode paste similarly prepared, using from 10 to 25 parts by weight of the 100 centipoises methyl cellulose, may be used. Where a higher or lower viscosity type methyl cellulose is used, the amount used per 120 grams of electrolyte should be appropriate to give pastes having properties similar to the paste described. Satisfactory paste have consistencies ranging from heavy syrup (100,000 centipoises at the temperature of spreading or use) to library paste, the latter being non-pourable but readily spreads. The paste should be sticky, adherent to metals, particularly zinc, and form a continuous bubble-free layer.

Water-soluble ethyl cellulose has substantially the same characteristics as methyl cellulose and any combination of either water-soluble methyl or ethyl cellulose of any viscosity may be used with any amount of aqueous electrolyte, provided the materials and amounts thereof are adjusted to give final pastes having the viscosities described.

The anode pastes may be made in any suitable manner other than that previously described, for example by macerating the alkyl cellulose in all or a portion of the electrolyte water, and then dissolving the electrolyte salt in such a solution. Caustic pastes for magnesium cells may be prepared in the same manner as salt pastes.

The electrolyte paste is assisted from spreading under pressure by the retainer illustrated. The combination of the electrolyte paste and retainer between clamped electrodes is important in a flat type cell. The paste must have such a consistency that it does not run or ooze out of the space between the electrodes on account of its own mobility but it should be as fluid as possible, short of the non-running stage, to afford the best electrical contact between the elements of the cell with which it contacts. The retainer serves the dual purposes of separating the electrode elements and the supporting and immobilizing the paste, yet the retainer differs from paper or other porous separator in that the retainer provides maximum current paths directly between the elements of the cell which contact the paste but prevents displacement of the paste.

In the cell of the present invention, the parts of the cell are under compression and the electrolyte paste would be squeezed from between the electrode elements if it were not for the retainer, which is preferably somewhat yieldable under the compression, so that as the electrode elements are forced together it provides a closed compartment containing the paste under compression, the retainer forming the side walls of the compartment and also spacing the electrode elements. The retainer may be of any material which does not disintegrate under the influence of the aqueous electrolyte, or nitrogen or such halogen as is used for depolarization, for instance synthetic resins or rubbers resistant to these influences, for instance those sold under the brand names of "nylon," "Vinyon," "neoprene" and the like. The retainer may also be a cellulose material, for instance pulpboard, which absorbs electrolyte solution and becomes conductive. Such retainers are preferably soaked in electrolyte before use to prevent partial dehydration of the paste. If the cellulosic materials are not soaked in electrolyte before use, they are preferably waterproofed, for instance, with wax.

Sufficient anode paste should be used to fill the compartment and have the paste packed tightly against the adjacent elements of the cell when the cell is compressed. Too little paste in the compartment does not sufficiently force the paste against the adjacent elements of the cell for the best contact and too much paste causes the excess paste to ooze from the periphery when the cell elements are pressed together with the possibility of establishing electrolyte contact with the adjacent cells.

The cathode 16 comprises carbon black mixed with aqueous electrolyte and compressed. The weight of the aqueous electrolyte runs from 3 to 333 parts by weight to 100 parts of the black. The wet mass is mechanically worked until free from lumps and then pressed in a mold under a pressure of from 5 to 500 pounds per square inch until it has a porosity of 5% to 70% and a density from 0.33 to 1.76. By a "porosity of 5% to 70%" is meant that from 5% to 70% of the volume of the cake is openings, pores or voids. The higher porosity is obtained when the lesser molding pressure is used on the cathode mix which contains the lesser amount of aqueous electrolyte. The higher the porosity, the more easily and thoroughly the depolarizing gas permeates the cathode and the better is the depolarizing action and the higher the voltage and amperage obtained from the cell up to the point where the cathode is so lightly compressed and so porous that the particles of carbon make poor contact with one another, the internal resistance of the cathode is increased appreciably, the molded cathode is so weak that it does not hold together and it has poor contact with the separator.

The moisture content of the cathode is important from several points of view. The water is the binder for the carbon black, it dissolves the depolarizing chlorine, it is the medium in which the depolarizing reaction occurs, it is the medium which absorbs the products of the depolarizing reaction, it is the carrier of the electrolyte salt or equivalent, and the solution which it forms with the electrolyte salt and the depolarization products is the medium by which the electric current passes between the anode and the cathode.

In the cell disclosed, the cathode cannot contain less than the minimum amount of water given else the carbon black will crumble and not form a strong cake and the cathode cannot contain more than the maximum amount of water given else the cathode is too soft to hold its shape. In the depolarizing reaction at the cathode, the water may be thought of as dissolving the $Cl_2$ in a form capable of reacting to depolarize the cathode. The rate at which depolarization occurs in the present cell is extremely high as the active cathode surface is very large, this rate depending upon the availability of the chlorine, that is the concentration of the chlorine at the cathode-electrolyte interface. The less amount of water in the cathode and the more porous the cathode, other conditions being the same, the more quickly the chlorine can reach all of the particles and the more quickly the chlorine will produce a concentrated aqueous depolarizing chlorine solution at the surface of the carbon particles. However, the greater the amount of water in the cathode, the longer will be the life of the cell, other conditions being the same and provided that the anode contains sufficient anodic metal to last for the life of the cell, as the greater quantity of water does not become saturated with the products of depolarization so quickly as does the smaller amount of water. The amount of water may be so great that, upon closing the circuit through the cell and simultaneously surrounding the cell with chlorine, the voltage of the cathode drops due to the initial polarization of the cathode before the water dissolves sufficient chlorine for effective depolarization. Subsequently, the voltage of the cell increases due to the depolarization of the cathode as the water dissolves chlorine.

It is physically possible to fill the pore openings of the cathode with water or aqueous electrolyte but in such case the depolarizing gas cannot enter the pores and the only depolarization is that occurring at the edges of the cathode or that due to the slow diffusion of dissolved chlorine to the inner portions of the cathode. The amount of water in the cathode should be such that the surfaces of all of the particles are wet and that the wet cathode is at least 13% as permeable to gas as is the cathode if no water were present.

The cathode cake is preferably from ⅛ to ½ inch thick, and may be up to 1 inch, or more, thick for long-life cells and as thin as ⅛ inch, or less, for short-life, lightweight cells. Other conditions being the same, a thicker cathode gives a cell of longer life as there is more water present to absorb depolarization products and there is a larger surface for depolarization.

The aqueous electrolyte preferably carries from 5 to 10 grams of zinc chloride to 95 to 90 grams of water, but may carry up to 50 grams of the chloride to 50 grams of water where there is danger of the cell freezing. For long-life cells, where there is no danger of freezing, there may be as little as 3 grams of chloride with sufficient water to make 100 grams solution.

In making the typical cathode, the acetylene black had a mean ultimate particle diameter of 43 millimicrons. Blacks with particle sizes from 5 to 100 millimicrons may be used. The effect of using the smaller particle size is to increase the sorption of electrolyte and gas, and increase the active cathode area. The effect of using the larger particle size is the reverse of the above.

The performance of the cell is dependent upon the pressure of chlorine within the cell. As previously stated, the depolarizing effect of the chlorine is dependent upon its availability to the cathode; and with cells of any given thickness, porosity and wetness of cathode, the greater the chlorine pressure to which the cell is subjected, the better is the depolarization and the greater the permissible current drain with the least lowering of voltage and the longer the life of the cell; and the quicker the chlorine pressure is built up around and within the cell, the sooner the cell reaches maximum performance.

With cells having cathodes of a molded porosity of 31.7%, a final thickness of 0.146 inch, a maximum distance of 0.90 inch for the chlorine to penetrate the cathode from any edge or channel and open circuit voltage of 2.11, operating voltages of 1.85 at a current drain of 0.77 ampere per square inch were reached in less than a minute after the admission of chlorine to the cells, it taking less than a minute to build up a chlorine pressure of 90 pounds per square inch in the container. The higher the chlorine pressure and the more porous the cathode and the less moisture in the cathode (provided all of the cathode particles are wet), the more nearly and quickly the voltage approaches the maximum full load voltage possible; and the smaller the current drain, the more nearly the load voltage approaches the open circuit voltage. The higher the chlorine pressure, the greater the amount of chlorine that can be forced into the moisture of the cathode and the longer the life of the cell. The speed with which a battery of cells is to activate, the current which it is to deliver and the length of time that the battery must deliver the current may be controlled by the rate at which the chlorine is admitted to the battery housing, a radio station, in case of power failure, probably requiring a source of high current at relatively constant voltage for several minutes but available in a second or so and a small telephone switchboard probably requiring a moderate amount of current at relatively constant voltage available in a matter of minutes but over a period of several hours or several days. For the radio station, high chlorine pressures of 100 pounds are built up in a second or less; and for the switchboard, a mere trickle of chlorine, which may even supply chlorine only at the rate the cell uses it in delivering the relatively small current demanded, may result in pressures lower than atmospheric continued for hours or days. A battery of cells having a total active anode area of 258 square inches delivering current at the rate of 0.85 ampere per square inch of active anode surface consumed only 4.9 grams of chlorine per minute.

To facilitate chlorine penetration into the cathode for quick activation of the cell, channels may be formed in the cathode extending into the cathode from the edges or extending entirely through the cathode from edge to edge dividing the cathode. The channels preferably are from about 1/8 to 1/4 inch wide and are so spaced that the distance from any channel to another channel or to an edge of the cathode is between 1 and 2 inches. The width of the channels and their distance apart depends upon the porosity of the cathode and the pressure of chlorine gas maintained in the cell chamber. Where the cathode has a high porosity of 70% and operates at a high chlorine pressure of 100 pounds per square inch, the channels can be 4 inches apart for activation of the cell within less than a second and 8 inches apart for activation of the cell within about a minute. Where the cathode is more dense and contains more water and has a porosity of 5% and operates at atmospheric chlorine pressure, the channels can be 3/8 inch apart for activation of the cell within 30 seconds.

The separator 18 may be omitted but is preferably used, particularly when a thin, light-weight cell is desired or a cell containing a large amount of water and a very soft anode paste and hard cathode mix or a cell under relatively high compression is prepared. If the separator were not used, there would be danger of the cathode mix penetrating the anode paste and making electrical contact with the anode, particularly where a thin layer of soft anode paste is used. The separator is sufficiently bibulous and porous that it imposes a minimum electrical resistance in the cell but is sufficiently tough that it is not punctured, at least to any appreciable extent, by the cathode mix and thus prevents the cathode from touching the anode and seals the anode compartment. The separator, however, is quite soft and flexible and is not disintegrated by the other materials of the cell; and thus the separator provides a highly conductive, long-lasting physical barrier between the anode and the cathode, preferably sufficiently soft and porous to receive with slight embedment, portions of the anode paste and particles of the cathode mix so that good electrical contact is made with both the anode paste and the cathode, sufficiently flexible that it has a tight physical engagement with the anode paste and by virtue of its contact with the retainer prevents even an extremely soft anode paste from running out of the compartments formed by the retainer, the anode and the separator, but sufficiently tough that it does not tear and allow the cathode to contact the anode.

The separator is preferably a sheet of kraft paper from 0.0005 to 0.005 inch thick. The separator is preferably wet with the aqueous electrolyte solution before being applied to the anode paste and retainer. The wetting softens the separator material and, where thoroughly soaked, supplies excess moisture at the immediately adjacent faces of the anode paste and the cathode, rendering all of the contacting parts quite soft and assuring good physical and electrical contact, and enables air bubbles to be eliminated from the inter-electrode contacts and seals the anode compartment against chlorine gas. Other separator materials which may be used are the textiles, either woven, felted, or otherwise prepared, of glass, synthetic materials or vegetable or mineral fibres which are not disintegrated by chlorine or the electrolyte. Where cathodes low in strength are used, it may be advantageous to mold the cathode mix directly onto one surface of the separator which reinforces the molded cake, and facilitates application of the cake to the retainer when the cell is assembled.

The electrolyte is preferably the chloride of the metal of the anode, the preferred anode being amalgamated zinc. Hydrochloric acid is considered for electrolyte purposes but, if used, allowance has to be made in the thickness of the anode for the corrosive action of the acid prior to use of the cell. The preferred electrolyte solution is an aqueous solution of the electrolyte salt in the proportion of from 5 to 10 parts by weight of zinc chloride to 95 to 90 parts of water. More or less zinc chloride may be used, the greater the proportion of the salt up to a 25 per cent solution, the more conductive the cell and the less the internal resistance; the higher the proportion the salt, the less is the amount of chlorine and hydrochloric acid which the cathode water will absorb and the shorter the life of the cell. The smaller the proportion of salt, the less is the initial conductivity of the cell and the greater the internal resistance but the longer the life of the cell.

The aqueous electrolyte solution used in making the anode paste preferably contains mercuric chloride in amounts corresponding to 2 milligrams up to 15 milligrams per square inch of active anode area, and varying as the thickness of the anode metal is increased or decreased, the effect of which is to amalgamate the surface of the zinc anode. The mercuric chloride may be omitted where the zinc is previously amalgamated, or where a non-amalgamated zinc anode is used. The mercuric chloride may be replaced in whole or in part with corresponding weights of other mercury salts, particularly halides, or with chromates or other corrosion-retarding compounds. Where zinc is the metal ion of the electrolyte, the aqueous electrolyte solution is preferably acidified with hydrochloric acid to a pH of 5 or below, about 2 drops of 37% hydrochloric acid per quart of electrolyte being added, to prevent the precipitation of basic zinc salts during preparation of the cell. During production and storage of the cell, the effect of the acid in the case of the anode is to remove the oxide film and facilitate amalgamation of the zinc by the mercury salt. In the case of the cathode the effect is nil. Where magnesium, aluminum and iron are the metals of the electrolyte, the mercuric chloride is preferably not used. The pH values of the aqueous electrolyte solutions should be 12-14 for the caustic electrolyte for magnesium, about 4 for the aluminum chloride electrolyte for an aluminum anode and about 5.5 for the ferrous chloride electrolyte for an iron anode.

In a battery, any number of cells may be arranged in series or in parallel or may be arranged in groups which are in turn arranged in series or in parallel to give such current and voltage for such a length of time as is desired. For typical cells, the open circuit voltages and the closed circuit voltages at current drains of 0.77 ampere per square inch are:

| Voltage | Magnesium | Zinc |
| --- | --- | --- |
| (a) Open circuit | 2.75-2.85 | 2.05-2.10 |
| (b) Closed circuit (0.77 a./in.²) | 2.30-2.50 | 1.75-1.85 |

For a battery with cells arranged to give 114 kilowatts for 3 minutes (5.7 kilowatt hours), the materials used and consumed were:

| | Magnesium | Zinc |
| --- | --- | --- |
| Material Used: | | |
| Metal— | | |
| Area (sq. ft.) | 550 | 740 |
| Weight lbs | 101 | 555 |
| (10 gauge=0.02 in.) | | |
| Cathode mix lbs | 225 | 300 |
| Material Consumed: | | |
| Metal lbs | 3 | 10.8 |
| Chlorine lbs | 9 | 11.8 |
| | (3 lbs./min.) | (4 lbs./min.) |

By using No. 3 gauge zinc (0.006 inch) the weight of zinc used can be reduced to 163 pounds. Thinner magnesium may also be used and still thinner sheets of other anode metals may be used provided they are stiffer than battery grade zinc.

The battery containing the cells disclosed herein is primarily intended to be a versatile standby battery which can be called upon in an emergency or whenever desired to deliver either an exceedingly high current at high voltage in less than a second after demand or a lower current at a lower voltage in more than a second after demand, depending, for cells of the same characteristics (porosity, moisture content, etc.), upon the chlorine pressure and the rate at which chlorine pressure is built up around the cells, a high chlorine pressure built up in less than a second giving a high output in less than a second and the same chlorine pressure built up over a space of minutes, hours or days giving the output at a lower current drain but over a longer time. Thus cells have been found operable at current densities ranging from 5 amperes or less up to 225 amperes per square foot of active anode surface. The high current densities possible with the cells of the present invention are due in part to the non-polarizing or quick depolarizing nature of the cathode. With cathodes of high porosity operating at high chlorine pressures, the voltage is relatively constant over a wide range of current drains, until the cell is exhausted. The high current densities are made possible by the cathode which is sufficiently moist that substantially all of the particles of the black are covered with films of moisture but the depolarizing gas in the gaseous phase is accessible to all of the films whereby the depolarizing agent can quickly get to all surfaces to be depolarized and the products of the depolarizing reaction can quickly move away from the surface.

What is claimed is:

1. A battery of cells of the type recited in claim 3 assembled with the anode of one cell adjacent the cathode of an adjoining cell, said anode and cathode being separated by a non-porous conductor.

2. A battery of dry cells of the deferred action, gas-depolarized type, each cell comprising a sheet zinc anode, a cathode comprising electrolyte and particles of acetylene black of chain type structure having a mean ultimate particle diameter between 5 and 100 millimicrons, the porosity of the cathode being between 5% and 70%, a continuous spacing and electrolyte-retaining element bearing against the peripheral portion of the anode leaving the central portion of the anode exposed, a bibulous sheet covering that face of the electrolyte-retaining element away from the anode and forming a chamber having the anode and the bibulous sheet as floor and ceiling and the electrolyte-retaining element as the peripheral wall, electrolyte in the bibulous sheet, flow-resistant electrolyte filling the chamber and in contact with the anode and sheet, the flow-resistant electrolyte comprising from 90 to 95 parts, by weight, of water, from 5 to 10 parts of zinc chloride and sufficient water-soluble methyl cellulose to give the flow-resistant electrolyte a consistency within the range from a viscosity of 100,000 centipoises to a paste, the cathode bearing against said sheet and compressing the sheet against the flow-resistant electrolyte, and a conductive, non-porous carbon sheet bearing on the face of the cathode away from said bibulous sheet; other cells of the battery bearing against adjacent cells with the anode of one cell against the non-porous conductive carbon sheet of an adjoining cell; and means to surround the cells with a gas containing a member of the group consisting of chlorine and bromine.

3. A primary dry cell of the deferred action, gas depolarized type comprising: a moist porous carbon cathode; a consumable metal anode; a spacer element between the adjacent portions of the anode and cathode and forming the periphery of a closed chamber for electrolyte; within the chamber an electrolyte material having a flow resistance within the range from a viscosity of 100,000 centipoises to a paste; the whole adapted to deliver current upon the entry of gaseous chlorine into the pores of the cathode; an ionically permeable, electrolyte-insoluble separator sheet between the electrolyte material and the cathode; means to hold the anode and cathode in position compressing the electrolyte material within the chamber and compressing the spacing element to prevent leakage of the said material; a casing enclosing the aforesaid parts; valve means for admitting gas to the cathode within the casing, the casing being gas tight when said valve means are closed; the pores of the cathode containing insufficient water to block the passage of gas through substantially the entire body of the cathode.

4. A dry cell of the structure stated in claim 3 within the cathode is principally carbon black with a chain type of structure and ultimate particle diameters of from 5 to 100 millimicrons.

5. A dry cell of the structure stated in claim 3 wherein the cathode contains at least one channel extending from the periphery of the cathode into the body thereof to pass gas from the interior of the casing into the body of the cathode.

6. A dry cell of the structure stated in claim 3 wherein the electrolyte material contains sufficient water-soluble alkyl cellulose to give said electrolyte material the flow resistance stated in claim 3.

7. A dry cell of the structure stated in claim 3 wherein the anode is a member of the group of metals consisting of aluminum, magnesium, zinc, iron, cadmium, nickel and copper.

8. A dry cell of the structure stated in claim 3 wherein the anode is magnesium and the electrolyte is alkaline prior to introducing chlorine into the cell.

9. A dry cell of the structure stated in claim 3 wherein the chlorine during discharge of the cell is at approximately the liquid-gas equilibrium pressure.

GEORGE W. HEISE.
ERWIN A. SCHUMACHER.

REFERENCES CITED

The following references are of record in the file of this patent:

UNITED STATES PATENTS

| Number | Name | Date |
|---|---|---|
| 470,073 | Ortelli | Mar. 1, 1892 |
| 1,377,722 | Marconi | May 10, 1921 |
| 1,837,361 | Ford | Dec. 22, 1931 |
| 1,890,178 | Heise et al. | Dec. 9, 1932 |
| 2,275,281 | Berl | Mar. 3, 1942 |
| 2,384,463 | Gunn et al. | Sept. 11, 1945 |

FOREIGN PATENTS

| Number | Country | Date |
|---|---|---|
| 7,189 | Great Britain | of 1886 |

OTHER REFERENCES

Ser. No. 282,296, Marhenkel (A. P. C.), published May 11, 1943.

Vinal et al.: Circular Bur. Stds., No. 79 (1923), p. 7.